C. ULVEN.
GRAIN TANK.
APPLICATION FILED DEC. 27, 1913.

1,203,159.

Patented Oct. 31, 1916.
2 SHEETS—SHEET 1.

WITNESSES

INVENTOR
CHRISTIAN ULVEN
BY
ATTORNEYS

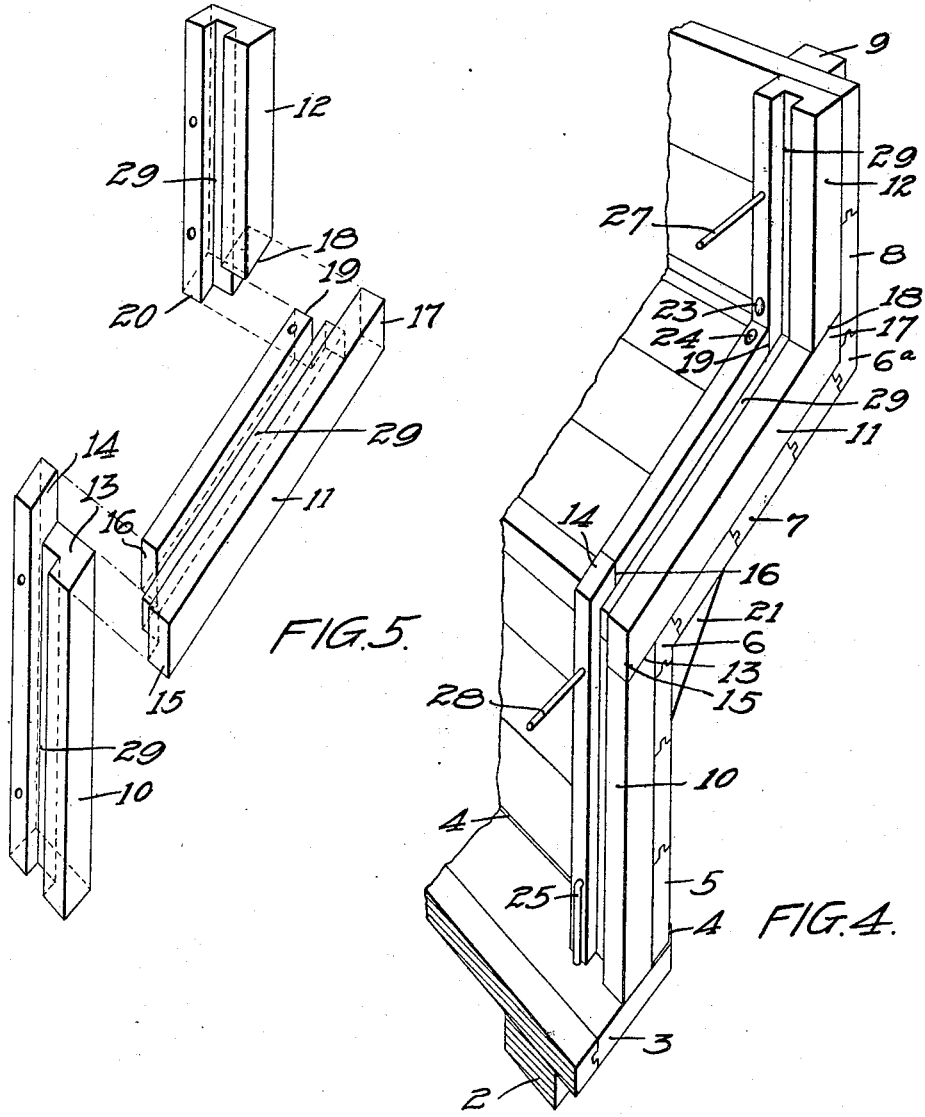

UNITED STATES PATENT OFFICE.

CHRISTIAN ULVEN, OF ST. PAUL, MINNESOTA, ASSIGNOR TO MINNEAPOLIS IRON STORE COMPANY, OF MINNEAPOLIS, MINNESOTA, A CORPORATION.

GRAIN-TANK.

1,203,159.  Specification of Letters Patent.  Patented Oct. 31, 1916.

Application filed December 27, 1913. Serial No. 809,091.

*To all whom it may concern:*

Be it known that I, CHRISTIAN ULVEN, citizen of the United States, resident of St. Paul, county of Ramsey, State of Minnesota, have invented certain new and useful Improvements in Grain-Tanks, of which the following is a specification.

My invention relates to tanks used for transporting grain in bulk from place to place. Generally in devices of this kind the pressure or outward bulge of the load will open up cracks or seams in the walls of the tank and allow a considerable portion of the grain to slide out and be lost.

The primary object, therefore, of my invention is to provide a tank which under all conditions will be grain-tight and will positively prevent the loss of such small grain as flax, transported therein.

The invention consists generally in various constructions and combinations, all as hereinafter described and particularly pointed out in the claims.

Figure 1:
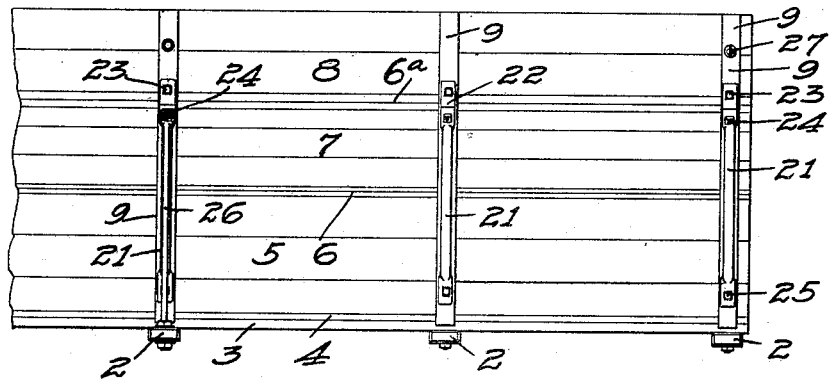
Figure 2:
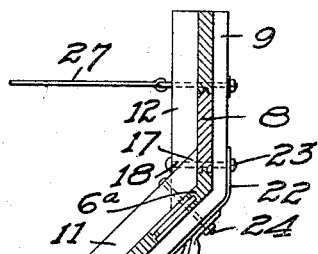
Figure 3:
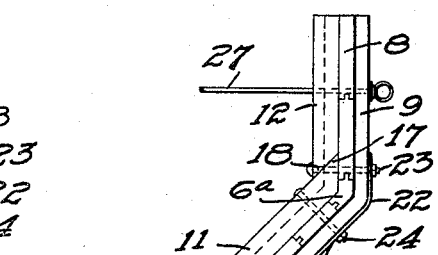

In the accompanying drawings forming part of this specification, Figure 1 is a side elevation of a portion of a grain tank embodying my invention, Fig. 2 is a transverse sectional view of a portion of the tank near the middle thereof, Fig. 3 is an end view of the tank, Fig. 4 is a perspective view, showing the reinforcing knee and the groove for the end gate at the rear end of the tank, Fig. 5 is a perspective view, showing the sections composing the inner portion of the knee, Fig. 6 is a perspective view, showing the angular strip extending lengthwise of the side walls of the tank at the point where the angles or bends are formed therein.

In the drawings, 2, 2 represent sills at the bottom of the tank, upon which the tongued and grooved floor boards 3 are placed. An iron angle bar 4 is preferably mounted on the outer floor boards and runs lengthwise of the tank, and its horizontal flange forms a seat for the lower section 5 of the side walls, also composed of boards having their edges tongued and grooved together. The other flange of the angle bar projects upwardly on the outside of the section 5 and forms a close, grain-tight joint therewith and with the floor of the tank. The section 5 extends vertically at right angles substantially to the tank floor and at a suitable distance therefrom is provided with an angle strip 6; the upper portion of which flares outwardly and merges into an intermediate side wall section 7, also composed of boards, tongued and grooved together. This side wall section flares outwardly for a suitable distance and is then provided with an angle strip corresponding to the strip 6, which I will designate by the same reference numeral, with the addition of the exponent "a," the position of said strip being reversed so that its upper portion is substantially vertical, instead of flaring outwardly. From this strip 6$^a$ the vertical section 8 extends and forms the top of the tank wall. These strips 6 and 6$^a$ not only provide for the flare of the middle portion of the tank, but also insure absolute grain tight joints between the vertical and flaring section of the tank wall. It will be understood, of course, that the other side of the tank is constructed in a similar manner, but I have not thought it necessary to illustrate it herein.

The tank wall formed, as described above, must necessarily be braced and secured in some suitable way, and I will now proceed to describe in detail the bracing knee which I prefer to employ. This knee is preferably composed of an inner and an outer part, the outer part comprising a member 9 that is steamed and bent to fit the angles of the side wall and lie snugly against the outer surface thereof. The inner part is composed of a lower section 10, an intermediate section 11 and an upper section 12. The section 10 has its lower end resting on the floor of the tank and seated against the section 5 of the side wall on the inside thereof, opposite the part 9, and terminates preferably at a point opposite the angular portion 6. The upper end of the section 10 has a beveled surface 13 which lies in the plane of the flaring upper surface of the part 6, and said section is also provided with an upwardly projecting part 14 extending above the surface 13. The knee section 11 is seated against the intermediate flaring portion 7 of the tank wall and has a projection 15 at its lower end which rests upon the angle member 6 and the surface 13 and is also provided with a shoulder 16 that is seated against the projection 14 so that when these sections are assembled their end portions will be in a bracing relation to one another and will resist lateral pressure on the walls of the tank. The upper end of the section 11 has a projecting portion 17 on which a beveled surface 18 of the section 12 is seated, and said section 11 also has a recess 19 therein to receive a projection 20 provided on the lower end of the section 12. This manner of jointing or interlocking the abutting ends of the knee sections insures the rigid bracing of the wall of the tank and prevents any portion of the wall from twisting or racking out of its proper position with respect to the other portion. It follows that where the side walls of the tank are held in their proper relative position, that no cracks or seams will be opened and there will be no possibility of leakage of grain.

Various ways may be devised for securing the knee members together and to the side walls, but I prefer to provide the construction which consists in a brace 21 having an upper portion 22 bridging the angle between the upper and intermediate portions of the knee and secured through the outer and inner parts of the knee and the wall of the tank by bolts 23 and 24, the lower end of the brace 21 being preferably secured by an L-shaped bolt 25, which passes through the lower portions of the knee and the wall of the tank and is secured to the floor sill through the bottom of the tank. In addition to this brace I prefer to provide at the middle of the tank or the point that is subjected to the greatest strain, a second brace 26 secured at its upper end by a bolt 24 and at its lower end to a lateral extension of the floor sill. At the ends of the tank the brace 21 will be found sufficient to provide the necessary rigidity. Suitable cross rods 27 and 28 connect the opposite walls and the rear knee of the tank has each section provided with a vertical groove 29 to receive the end gate of the tank in the usual way. This end gate forming no part of my present invention, I have not thought it necessary to illustrate it or describe it herein.

The tank may be made in various sizes and the number of bracing knees may be increased or decreased, as occasion may require, and in various ways the details of construction herein shown and described may be modified and still be within the scope of my invention.

I claim as my invention:

1. A grain tank comprising a floor, upright side walls, and an angle-plate extended throughout the length of each side of the floor with its horizontal flange extending inwardly between the lower edge of the side walls and the top of the floor and its inner edge terminating adjacent to the inner face of the side wall and its vertical flange, lying against the outside of the side walls to form a grain tight joint at the meeting points of the floor and side walls.

2. A grain tank comprising a floor, side walls consisting of lower and upper upright portions and an intermediate upwardly and outwardly inclined portion, and angle-shaped members connecting the intermediate with the lower and upper upright portions of the sides, said angle-members having the edges of their angles abutting against the adjacent edges of the inclined and upright portions of the wall and interlocked therewith.

3. A grain tank comprising a floor, sidewalls consisting of lower and upper upright portions and an intermediate upwardly and outwardly inclined portion, and bracing knees for the side walls, said knees consisting of lower and upper upright members and an intermediate upwardly and outwardly inclined member fitted to the inside corresponding portions of the side walls, the upper end of the lower member and lower end of the upper member being recessed on corresponding sides, and the opposite ends of the intermediate member being recessed on one face so that the tongue of one member will fit in the recess of the adjoining member to form interlocking abutting shoulders and tongues at the meeting ends of the members, and means securing the knees to the side walls of the tank.

4. A grain tank comprising a floor, side walls consisting of lower and upper upright portions and an intermediate upwardly and outwardly inclined portion, and bracing rods extending diagonally from the lower upright portions to the upper part of the upwardly and outwardly inclined portion and having a part thereof bridging the angle between the upper upright portion and the inclined portion, and bolts securing the bridging portion of the rods to the sidewalls at both sides of the angle between the inclined and upper upright portions of the walls.

In witness whereof, I have hereunto set my hand this 22d day of December, 1913.

CHRISTIAN ULVEN.

Witnesses:
GENEVIEVE E. SORENSEN,
EDWARD A. PAUL.

Copies of this patent may be obtained for five cents each, by addressing the "Commissioner of Patents, Washington, D. C."